(12) United States Patent
Lennen

(10) Patent No.: US 7,664,207 B2
(45) Date of Patent: Feb. 16, 2010

(54) DECODING GPS SATELLITE DATA AT LOW SIGNAL TO NOISE LEVELS BY COMPUTING TOTAL PROBABILITY OF CURRENT DATA BIT AT CURRENT TIME EPOCH

(75) Inventor: Gary R. Lennen, Cupertino, CA (US)

(73) Assignee: Trimble Navigation, Ltd., Sunnyvale, CA (US)

( * ) Notice: Subject to any disclaimer, the term of this patent is extended or adjusted under 35 U.S.C. 154(b) by 92 days.

(21) Appl. No.: 11/891,423

(22) Filed: Aug. 10, 2007

(65) Prior Publication Data

US 2008/0069271 A1    Mar. 20, 2008

Related U.S. Application Data

(63) Continuation of application No. 10/647,035, filed on Aug. 21, 2003, now Pat. No. 7,260,160.

(51) Int. Cl.
*H03D 1/00*     (2006.01)
*H04L 27/06*    (2006.01)

(52) U.S. Cl. .............. 375/340; 375/324; 375/326; 375/327; 375/376; 375/341

(58) Field of Classification Search ........... 375/340, 375/324, 325, 326, 327, 329, 376, 261, 341, 375/262, 265; 329/304, 306, 307; 714/777, 714/795, 796
See application file for complete search history.

(56) References Cited

U.S. PATENT DOCUMENTS

| | | | |
|---|---|---|---|
| 6,163,873 A * | 12/2000 | Murano | 714/782 |
| 6,546,040 B1 | 4/2003 | Eschenbach | |
| 6,944,206 B1 * | 9/2005 | Dent | 375/144 |
| 7,260,160 B1 * | 8/2007 | Lennen | 375/340 |

* cited by examiner

*Primary Examiner*—Phuong Phu
(74) *Attorney, Agent, or Firm*—Boris G. Tankhilevich

(57) ABSTRACT

A method of decoding a GPS carrier signal comprising: (A) receiving a phase modulated GPS signal by using a GPS antenna; (B) extracting a GPS data from the received phase modulated GPS signal; and (C) computing a total probability of a current GPS data bit being "one" or "zero" at a GPS time epoch by using a decoding algorithm.

2 Claims, 13 Drawing Sheets

011x0001111001111011xxxxx0111100xxxxxxxxxxxxxx0110101100110010110010111 00xxxxxxxxxxxxxxxxxxxxxxxxxx
xxxxxxxxxxxx111111001100001000110010011 01xxxxxxxxxxxxxxxxxxxxxxxxxxxxxxxxxx00100011100001001101111 01
1100010xxxxxxxxx0111101111010101xxxxxxxxxxx1001x1101011xxxxxxxxxxxxxx11010001x1001101111100010110010
1011110101001001000111100100 1010xxxxxxxx111111001000xxxxxxxxxxxx1000100000100101010xxxxx0xxxxxxxxxxxx
xxxxxxxxxxxxxxxxxxxxxxx0x01001xxxxxxxxxxxxxxxxxxxxxxx10001110100001010010 01xxx1xxxxxxxxxxxxxxxxxxxxx
xxxxxxxxxxx100xxxxxxxxxx1110xxxxxxxx0xxxxx10110xx1xxxxxxxxxxxxxxxxxxxxx0xxxxxxxxxxxxxxxxxx0001001100
0011111101001111010011001xxxxxxxxxxxxxxxxxxx0x00100101011010110100111000010010001100001011 00x0110111
0000111000010010111 0xxxxxxxxxxxxxxxxxxxxxxxxxxx0xxxxxxxxxxxxxxxxxxxxxxxxxxxxxxx1xxxxxxxxxxxxxxxxxxxx
xxxxxxxxxxxxxxx0111x1011100xxxxxxxxxxxxxxxxxxxxxxxxxxxxxxxxxxxxxxxxxxxx0000000000010001100 1x001001011
00000111101100011 1xxxxxxxxx110100001101000101011010011010111 00001xxxxxxxxxxxxx10100101101110101010 10
10101011010100110101000 01x00x010111011001xxxxxxxxxxxxxxxxxxxxxxxxxxx0101111010110101010000000000xx1xxx
xxxxxxx1100000000011111001011100011100011000100 0x1100000011110111001x111101010101111101110011001001 1
0110001111000100101100110 1x1001101101001100101110111011010100011010101110010100011111101100xxxxxxxx
xxxxxxxxxxx110010010001110001111 11xxxx1xxxxxxxxxxxxxxxx11100001 1x101101110011100xxxxxx1011101001xxx
xxxxxxxxxxxxxxxxxxxxxxxxxxxxxx01111x1xxxxxxxxxxxxxxxxxxxxxxxxxx11011x11xxxxxxxxxxx0xxxx011101101000xxxx

FIG. 12b

DECODING GPS SATELLITE DATA AT LOW SIGNAL TO NOISE LEVELS BY COMPUTING TOTAL PROBABILITY OF CURRENT DATA BIT AT CURRENT TIME EPOCH

This is the continuation for the patent application Ser. No. 10/647,035, filed on Aug. 21, 2003, now U.S. Pat. No. 7,260, 160 and entitled "METHOD AND APPARATUS FOR DECODING GPS SATELLITE DATA AT LOW SIGNAL TO NOISE LEVELS".

BACKGROUND OF THE INVENTION

1. Field of the Invention

The present invention relates to the field of decoding a GPS satellite data, and more specifically, to the field of decoding a GPS satellite data having a low signal-to-noise ratio (SNR).

2. Discussion of the Prior Art

The data stream transmitted by GPS satellites is described in detail in "Global Positioning System: Theory and Applications", Volume 1, pages 121-176, third printing, 1996. The GPS 50 bits/s (Baud) data stream includes an important information used by a GPS receiver to perform a satisfactory navigation, to realize a valuable time transfer function, to obtain a geodetic surveying, and/or to perform a set of satisfactory velocity measurements. These navigation data are uploaded to each satellite by the GPS Control Segment (CS) for later broadcast to the user.

More specifically, the 50 Baud GPS data stream includes (a) Ephemeris information including a detailed information about a particular satellite's orbit position and clock offset, (b) Almanac information including a less accurate information about all satellite orbits and clock offsets, and (c) a satellite health information, that is whether any particular satellite should be used by a GPS receiver to facilitate position calculation. The capability to receive all relevant GPS data from the combination of information obtained from the 50 Baud data stream is one of the aspects that are critical to the receiver's operation in being able to compute position, time and velocity.

In the prior art, in low SNRs applications (for example, in indoor applications) a typical GPS receiver fails to decode 50 Baud data. As a result, in the prior art, the satellites emanating a low SNR data could not be used in a navigation solution.

What is needed is to improve a GPS receiver capability to decode a GPS data stream having low SNR, thus enabling GPS receivers to use a low SNR GPS satellite in a navigation solution.

SUMMARY OF THE INVENTION

To address the shortcomings of the available art, the present invention provides a novel method of decoding a signal having low SNR.

In one embodiment, the method of the present invention for decoding a phase modulated carrier signal comprises: (A) receiving a phase modulated carrier signal; (B) performing a frequency loop lock (FLL) tracking of the received phase modulated signal having a carrier frequency; (C) locking on to the carrier frequency of the received phase modulated signal by using the FLL; (D) computing inphase and quadrature correlation data corresponding to the phase modulated carrier signal at a plurality of time epochs; (E) computing a first partial probability of a current data bit at a current time epoch by using the computed in the step (D) inphase and quadrature correlation data corresponding to at least two consecutive time epochs, each consecutive time epoch preceding the current time epoch; (F) repeating the step (E) for a plurality of time epochs preceding the current time epoch to obtain a plurality of partial probabilities of the current data bit; (G) computing the total probability of the current data bit by using the computed in the step (F) plurality of partial probabilities of the current data bit; and (H) outputting the current data bit as being "one" or "zero" at the time epoch based on the computed in the step (G) total probability.

In one embodiment, the method of the present invention of decoding a phase modulated carrier signal comprises: (A) receiving the phase modulated carrier signal; (B) performing a frequency loop lock (FLL) tracking of the received phase modulated signal having a carrier frequency; (C) locking on to the carrier frequency of the received phase modulated signal by using the FLL; (D) computing a total probability of a current data bit being "one" or "zero" at a time epoch by computing a plurality of probabilities of phase transitions at a plurality of time epochs, wherein the probability of a phase transition at a time epoch comprises a probability of a phase transition between the current phase of the received phase modulated signal and the phase corresponding to a previously computed data bit; (E) outputting the current data bit as being "one" or "zero" at the time epoch based on the computed in the step (D) total probability; and (F) multiplying the current data bit by an absolute data polarity.

In one embodiment, the method of the present invention of decoding a GPS carrier signal comprises: (A) receiving a phase modulated GPS signal by using a GPS antenna; (B) performing a frequency loop lock (FLL) tracking of a received phase modulated GPS signal having a carrier frequency by using a GPS digital tracker; (C) locking on to the GPS carrier frequency of the received phase modulated GPS signal by using a tracking and navigation block; (D) extracting a GPS data from the received phase modulated GPS signal; (E) computing inphase and quadrature GPS correlation data corresponding to the GPS phase modulated carrier signal at a plurality of GPS time epochs; (F) computing a first partial probability of a current GPS data bit at a current GPS time epoch by using the computed in the step (E) inphase and quadrature GPS correlation data corresponding to at least two consecutive GPS time epochs, each consecutive GPS time epoch preceding the current GPS time epoch; (G) repeating the step (F) for a plurality of GPS time epochs preceding the current GPS time epoch to obtain a plurality of partial probabilities of the current GPS data bit; and (H) computing the total probability of the current GPS data bit by using the computed in the step (G) plurality of partial probabilities of the current GPS data bit.

In one embodiment, the method of the present invention of decoding a GPS carrier signal comprises: (A) receiving a phase modulated GPS signal by using a GPS antenna; (B) performing a frequency loop lock (FLL) tracking of a received phase modulated GPS signal having a carrier frequency by using a GPS digital tracker; (C) locking on to the GPS carrier frequency of the received phase modulated GPS signal by using a tracking and navigation block; (D) extracting a GPS data from the received phase modulated GPS signal; (E) computing a total probability of a current GPS data bit being "one" or "zero" at a GPS time epoch by computing a plurality of probabilities of phase transitions at a plurality of GPS time epochs, wherein the probability of a phase transition at one GPS time epoch comprises a probability of a phase transition between the current phase of the received GPS phase modulated signal and a phase corresponding to a previously computed data bit; (F) outputting the current GPS data bit as being "one" or "zero" at the GPS time epoch based on the computed in the step (E) total probability; and (G) multiplying the current GPS data bit by an absolute GPS data polarity.

In one embodiment, the method of the present invention of decoding a carrier signal comprises: (A) receiving a phase modulated signal by using an antenna; (B) performing a frequency loop lock (FLL) tracking of a received phase modulated signal having a carrier frequency by using a digital tracker; (C) locking on to the carrier frequency of the received phase modulated signal by using a tracking and navigation block; (D) extracting a data from the received phase modulated signal; (E) computing inphase and quadrature correlation data corresponding to the phase modulated carrier signal at a plurality of time epochs; (F) computing a first partial probability of a current data bit at a current time epoch by using the computed in the step (E) inphase and quadrature correlation data corresponding to at least two consecutive time epochs, each consecutive time epoch preceding the current time epoch; (G) repeating the step (F) for a plurality of time epochs preceding the current time epoch to obtain a plurality of partial probabilities of the current data bit; and (H) computing the total probability of the current data bit by using the computed in the step (G) plurality of partial probabilities of the current data bit.

In one embodiment, the method of the present invention of decoding a GPS carrier signal without performing the initial step of tracking the GPS signal comprises: (A) receiving a phase modulated GPS signal by using a GPS antenna; (B) extracting a GPS data from the received phase modulated GPS signal; and (C) computing a total probability of a current GPS data bit being "one" or "zero" at a GPS time epoch by using a decoding algorithm.

In one embodiment, the method of the present invention of decoding a GPS carrier signal without performing the initial step of tracking the GPS signal further comprises: (D) using the Hamming code to correct residual data bit errors, wherein the data bit correction capability of the Hamming code is higher than the expected percentage of the residual data bit errors.

In one embodiment, the method of the present invention of decoding a GPS carrier signal without performing the initial step of tracking the GPS signal further comprises: (E) outputting corrected by the Hamming code GPS data bit having the total probability obtained in the step (C4) of being the actual received GPS data bit at the time epoch k for further processing.

In one embodiment of the present invention, the step (C) further comprises: (C1) obtaining an absolute data polarity via preamble sequence detection; C2) reading correlator $I_P$ (inphase punctual) and correlator $Q_P$ (quadrature punctual) at each epoch times; wherein a new GPS data bit is transmitted at each epoch time; (C3) computing the partial probability of the decoded data bit $r_k$ at time epoch k by computing the phase change between data bit phase $d_k$ at time epoch k and data bit phase $d_{k-1}$ at time epoch (k-1); (C4) computing a total probability of the decoded data bit $r_k$ at time epoch k by summing the partial probability obtained in step (C3) over the N preceding time epochs (k-1), (k-2), . . . (k-N); and (C5) multiplying a new data bit $r_k$ at time epoch k obtained in the step (C4) by the absolute data polarity obtained in the step (C1) to obtain a data bit having the total probability obtained in the step (C4) of being an actual received GPS data bit at the time epoch k.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 12A illustrates a prior art data bit stream decoded from a signal having SNR of 8 dB.

FIG. 12B is a data bit stream decoded from a signal having SNR of 8 dB by using the decoding method of the present invention.

DETAILED DESCRIPTION OF THE PREFERRED AND ALTERNATIVE EMBODIMENTS

Figure 1:
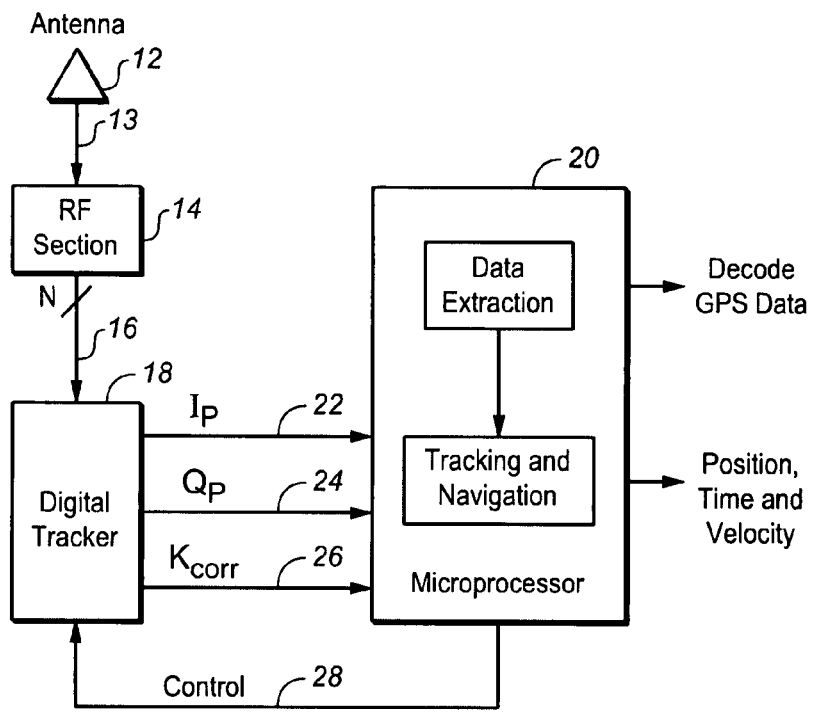
FIG. 1 depicts a block diagram of a GPS receiver of the present invention including novel Data Extraction capable of decoding GPS signal with low SNR.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

In one embodiment, the present invention relates to decoding of 50 Baud data from GPS satellites under low signal-to-noise ratio (SNR) conditions. GPS satellites transmit signal power such that a receiver on the surface of the Earth with clear view of the sky should expect to receive signal power of at least −130 dBm. If 'u', is a real, nonnegative, power signal (units of watts), the dBm conversion is equivalent to performing the dB operation after converting the input to milliwatts:

$$y=10*\log 10(u)+30 \tag{Eq. 1}$$

For the transmit signal power details, please, see "GPS Interface Control Document", ICD-GPS-200, IRN-200B-PR-OOJ, Rev. B-PR, U.S. Air Force, Jul. 1, 1992.

The received signal power may be translated into an SNR across each 50 Baud data bit by taking into account noise sources, receiver losses and bandwidths. The received signal having −130 dBm power corresponds to approximately to a signal having 28 dB SNR across each data bit. At these SNRs levels data the bit error rate (BER) is relatively low, the bit errors are very rare and can be easily detected and corrected via, for example, the data's forward error correction (FEC) capabilities. In recent years GPS operation has been extended to include indoor and other applications where the received signal power is expected to be substantially reduced. For example, the received signal power target for indoor applications is −150 dBm that is 20 dB lower than the nominal signal power. The received signal having −150 dBm power corresponds to a signal having an SNR across each data bit of 8 dB. At this SNR level (of 8 dB) the data bit errors are much more frequent that data bit errors in the case of a signal having 28 dB SNR across each data bit.

In addition, as another effect of low SNR conditions, the phase locked loop (PLL) technique does not operate adequately for signals having SNR level of 8 dB or lower. Therefore, the phase locking the carrier tracking loop in the GPS receiver becomes unreliable for signals having SNR level of 8 dB or lower.

Unreliable phase locking can lead to false lock on signal sidebands and other loss of lock phenomena. Therefore, 50 Baud data decoding using the phase locking is very difficult. In the prior art, a common practice used to ensure reliable signal tracking is to utilize a frequency locked carrier tracking loop under low SNR conditions. The prior art frequency locked loop (FLL) provides reliable tracking but creates additional problems associated with 50 Baud data decoding. The present invention allows one to overcome the prior art FLL data decoding problems and to achieve a reliable 50 Baud data decoding at SNRs lower than with prior art techniques, thus resulting in improved GPS receiver performance.

In one embodiment, FIG. 1 shows a high level block diagram 10 of the present invention. The satellite signals (not shown) are received via an Antenna block 12 and are further processed via an RF Section 14. In one embodiment of the present invention, the RF Section 14 is configured to digitize the received satellite signal 13 thus providing an N-bit digital signal 16 to a Digital Tracker block 18.

Referring still to FIG. 1, in one embodiment of the present invention, the Digital Tracker block 18 includes a plurality of digital mixers (not shown) and numerically controlled oscillators (NCOs) (not shown) for carrier removal, and a C/A code generator (not shown) with logic for correlating with the incoming satellite code. The Digital Tracker 18 facilitates tracking of code and carrier components of the incoming satellite signal. The Antenna 12, RF Section 14 and Digital Tracker 18 blocks have been previously described in detail in the U.S. Pat. No. 5,621,416 "Optimized Processing of Signals for Enhanced Cross-Correlation in a Satellite Positioning System Receiver", issued Apr. 15, 1997. '416 patent is incorporated by reference herein in its entirety.

More specifically, '416 patent discloses a satellite receiver configured for optimum correlation processing of L1 and L2 signals received from at least one satellite. The satellite receiver of '416 patent includes a dual frequency patch ANTENNA (not shown) for receiving the L1 and L2 satellite signals; a FILTER/low noise amplifier (LNA) (not shown) for performing filtering and low noise amplification of the L1 and L2 signals; a DOWNCONVERTER (not shown) for mixing and converting the L1 and L2 signals; and an IF PROCESSOR (not shown) for transforming the converted L1 and L2 signals into digitally sampled quadrature versions of L1 and L2 signals (IL1, QL1, IL2, QL2).

The satellite receiver of '416 patent includes the DIGITAL CHANNEL PROCESSOR (not shown) including an L1 TRACKER (not shown) for tracking L1 C/A code when Y code is ON and for tracking L1 P code when Y code is OFF; an L2 TRACKER (not shown) for tracking an enhanced cross correlated W code when Y code is ON and for tracking L2 P code when Y code is OFF; and a MICROPROCESSOR system (not shown). The L1 TRACKER is fed by digitized inphase IL1 and quadrature QL1 of L1 signal outputted by the IF PROCESSOR. The L2 TRACKER is fed by digitized inphase IL2 and quadrature QL2 of L2 signal outputted by the IF PROCESSOR. The MICROPROCESSOR system is fed by output signals from the L1 TRACKER and the L2 TRACKER; and the L1 TRACKER and the L2 TRACKER are fed by control signal from the MICROPROCESSOR.

The L1 TRACKER of '416 patent provides a locally generated replica of C/A code and P-code, multiplies digitized inphase IL1 and QL1 signals having carrier frequency with inphase and quadrature components of digital carrier, and performs code correlation with the locally generated replica of C/A code at 3 time points (early, punctual and late) on the autocorrelation function graph creating an early, a punctual and a late sample of the autocorrelation function, and integrates the IE (inphase early), the IP (inphase punctual), the IL (inphase late), the QE (quadrature early), the QP (quadrature punctual), and the QL (quadrature late) versions of the correlated samples of the L1 C/A (or P) code with the locally generated version of C/A (or P) code across a time period given by a multiple of L1 C/A EPOCH codes, wherein the MICROPROCESSOR develops feedback signals for the carrier tracking loop and for the code tracking loop. The IE, IL, QE, and QL signals are used by the code tracking loop to form: (1) a code phase estimate=K1(IE−IL), when the carrier loop is locked; or (2) a code phase estimate=K1 [(IE$^2$+QE$^2$)$^{1/2}$−(IL$^2$+QL$^2$)$^{1/2}$], when the carrier loop is not locked; K1 is an L1 code loop gain factor. The IP and QP signals are used by the carrier tracking loop by forming a carrier phase estimate=arctan(QP/IP). Similarly, the L2 TRACKER of '416 patent performs the same operations on the L2 signals as the L1 TRACKER on the L1 signals.

Referring still to FIG. 1, in one embodiment of the present invention, the Digital Tracker 18 provides correlation signals ($I_P$ 22, $Q_P$ 24 and $K_{corr}$ 26) to a Microprocessor block 20. The functions of the Microprocessor 20 include closing code and carrier tracking loops via the Control signal fed back to Digital Tracker block 18 (the brief explanation was provided in the analysis of the '416 patent above).

In one embodiment of the present invention, the Digital Tracker 18 includes a number of correlators used for different purposes including signal search, code tracking, carrier tracking and data decode (e.g. see '416 patent). The present invention focuses primarily on two correlators, the punctual in-phase correlation ($I_P$) and the punctual quadrature phase correlation ($Q_P$). Other correlators in the receiver, and there may be many, are represented by signal $K_{corr}$. The primary purpose of the $I_P$ and $Q_P$ correlators is to facilitate closing of the carrier tracking loop and to facilitate decoding of the 50 Baud data.

Figure 2A:
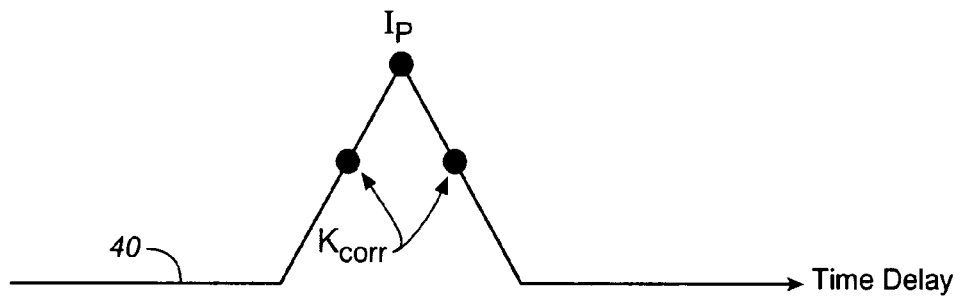
FIG. 2A shows in-phase (I) correlation outputs.
Figure 2B:
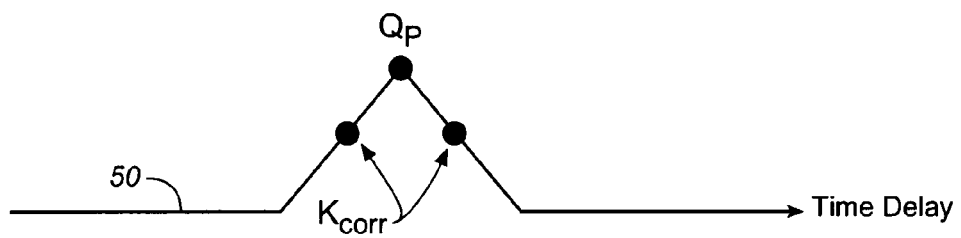
FIG. 2B illustrates quadrature (Q) correlation outputs.

FIGS. 2A and 2B show the signal amplitude of the various correlators. The x-axis represents the time delay between locally generated and incoming satellite generated C/A codes. Both $I_P$ correlator 40 (of FIG. 2A) and $Q_P$ correlator 50 (of FIG. 2B) are formed at the maximum signal time delay (when satellite and locally generated C/A codes are aligned). $I_P$ and $Q_P$ are chosen for data decode operation because they are points of maximum signal amplitude which in turn minimizes the probability of data bit errors for a given SNR. The $I_P$ and $Q_P$ correlators are generated by mixing the incoming signal with carriers that are 90° apart, in this way the receiver can measure the difference between the locally generated carrier signal and the incoming satellite carrier signal by forming the function:

$$C_{phase} = \tan^{-1}(Q_P/I_P);\quad\quad\quad\text{(Eq. 2)}$$

where $C_{phase}$ is a carrier phase offset between a locally generated carrier (in Digital Tracker 18 of FIG. 1) and an incoming satellite generated carrier.

According to Eq. 2, a change in the carrier phase $C_{phase}$ causes a change in the relative amplitudes $I_P$ 40 (of FIG. 2A) and $Q_P$ 50 (of FIG. 2B) of the signal, wherein the full amplitude of the signal given by $(I^2+Q^2)^{1/2}$ remains constant.

In one embodiment, the GPS data decoding method of the present invention is associated with the carrier tracking because the GPS 50 Baud data stream modulation format involves phase modulating the GPS carrier. The GPS data is modulated by using Binary Phase Shift Keying (BPSK). A new GPS data bit is transmitted every 20 milliseconds.

Figure 3:
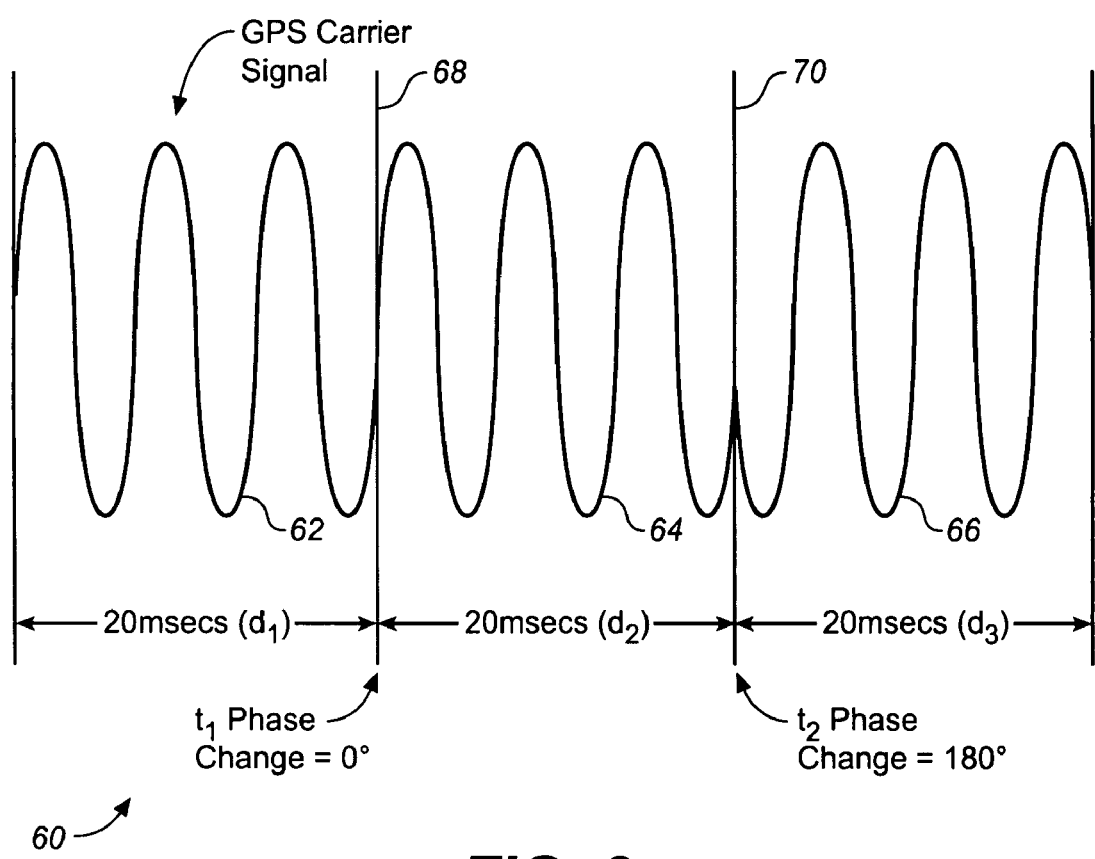
FIG. 3 depicts a diagram of data modulation effect on GPS carrier signal.

In one embodiment of the present invention, FIG. 3 illustrates the GPS carrier phase when modulated by data. The GPS data bit has two possible outcomes for the carrier, either the new data bit will leave the carrier phase unchanged or it will flip the carrier phase by 180°. Three data bit periods of 20 milliseconds each are shown, ($d_1$ 62, $d_2$ 64, and $d_3$ 66). Transition from one data bit state to another occurs on 20 millisecond boundaries $t_1$ 68 and $t_2$ 70. At data bit boundary $t_1$ 68 the phase of the carrier is continuous. This indicates that the new data bit ($d_2$ 64) is the same as the one transmitted before it ($d_1$ 62).

On the other hand, the new data bit ($d_3$ 66) starting transmission at time $t_2$ 70 causes an 180° phase shift in the carrier, indicating that the data bit $d_3$ 66 is of opposite polarity to the polarity of data bit $d_2$ 64. Thus, to determine the sequence of information bearing data bits, a receiver has to monitor the carrier phase.

Figure 4:
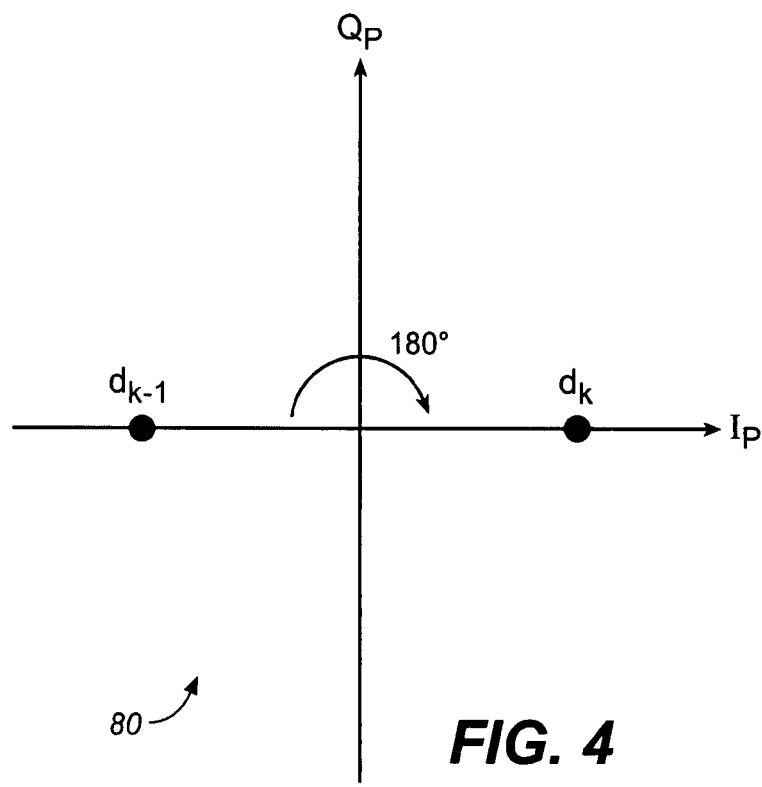
FIG. 4 shows a diagram of phase locked loop lock position in IQ plane.

In one embodiment of the present invention, FIG. 4 shows the basic relationship 80 between $I_P$ and $Q_P$ correlation signals in the presence of data bit transitions. FIG. 4 is known as an IQ plane plot and it illustrates the current carrier phase, $C_{phase}$ as measured by the GPS receiver. A PLL type carrier tracking loop typically seeks to minimize the signal amplitude in the $Q_P$ correlation, thus minimizing $C_{phase}$ according to (Eq. 2). FIG. 4 illustrates the ideal result of such a PLL operation, with $Q_P$ signal amplitude equal to zero. The remaining signal amplitude equal to $I_P$ [$(I_p^2+Q_p^2)^{1/2}$ (at $Q_P=0)=\text{Å}I_P$] is shown as two points on FIG. 4 with $d_k$ 82 and $d_{k-1}$ 84 representing the two possible signal points caused by different data bit effects on the signal's carrier phase. A new data bit causes an 180° phase shift (from (+)$I_P$ to (−)$I_P$, or from (−)$I_P$ to (+)$I_P$) (as shown in FIG. 4), or zero phase shift (i.e. carrier phase remains at last point) (not shown).

In one embodiment of the present invention, FIG. 4 shows the data bit transition from $d_{k-1}$ 84 to $d_k$ 82 of 180°, thus indicating that data bit $d_k$ 82 is opposite in polarity from data bit $d_{k-1}$ 84. GPS receivers typically decode the data (for instance, the data presented in FIG. 4) by observing the sign of the current $I_P$ signal. Under these conditions each data bit is decoded independently of other data bits around it. Absolute polarity of the data bits further involves decoding the Preamble sequence included in the GPS data message. (Please, see "Global Positioning System: Theory and Applications", Volume 1, pages 121-176, third printing, 1996, for details). For the purpose of the present invention, a positive $I_P$ of FIG. 4 is decoded as a binary '1', and a negative $I_P$ is decoded as a binary '0'. It is known to a person skillful in the art, to also refer to the binary data bit possibilities as '−1' and '+1'.

Figure 5:
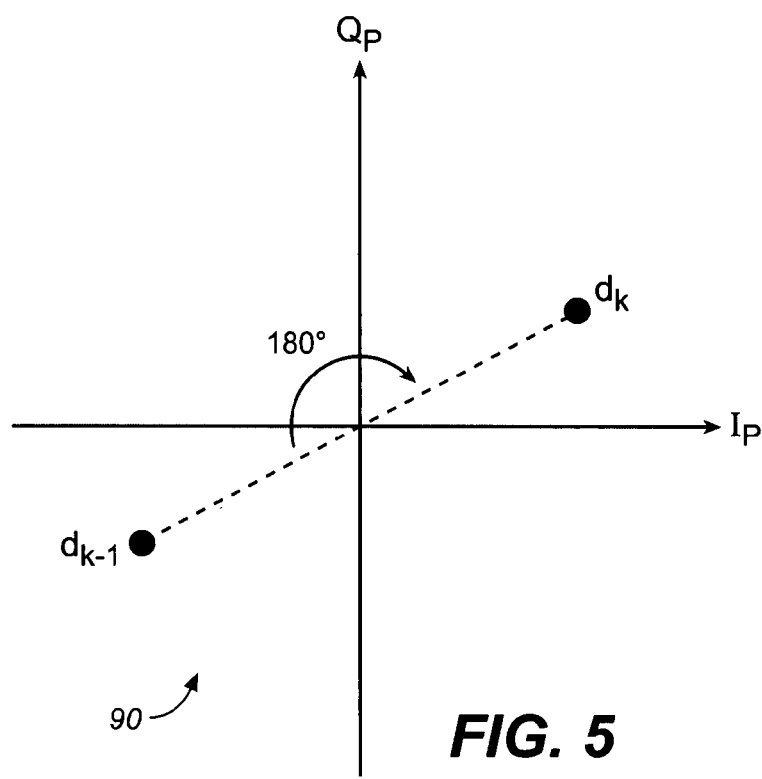
FIG. 5 illustrates a diagram of frequency locked loop phase position in IQ plane.

In one embodiment of the present invention, FIG. 5 shows a possible IQ plane plot 90 when phase locking the carrier is no longer possible and instead of using the phase lock loop (PLL) one has to use a frequency lock loop (FLL) to track and lock on a carrier signal. Under FLL tracking the phase of the signal in the IQ plane can take on any value and is not restricted to signal energy lying on the $I_P$ axis. Therefore, the sign of only $I_P$ correlation is no longer adequate to perform data bit decoding, because the contribution of $Q_P$ correlation cannot be ignored. With FLL tracking the typical data decoding algorithm differentiates a binary '0' and '1' by determining if a phase transition of 0° or 180° has occurred between data bits. However, the FLL tracking-based data decoding has 'memory' (as opposed to PLL tracking-based data decoding that has no memory) in that the probability of current data bit being decoded correctly is dependent on the accuracy of the previous data bits decoding. Therefore, if the previous data bit is decoded wrongly the probability of the current data bit being wrongly decoded is relatively high and cannot be ignored. This dependence on the accuracy of previous data bits is at the core of the major problem with decoding data while using an FLL tracking method. The present invention specifically deals with this problem, as it is fully described below.

Figure 6A:
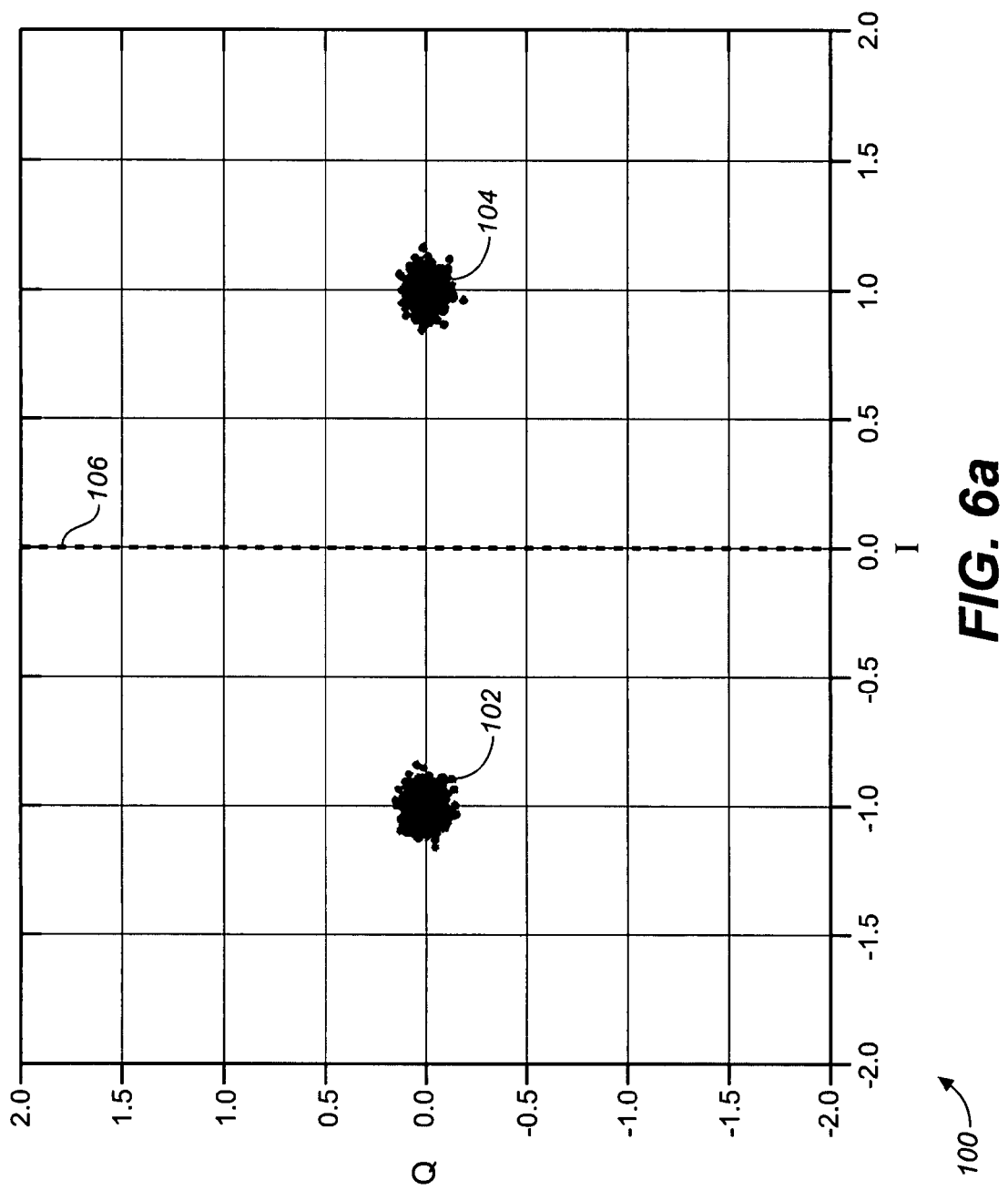
FIG. 6A depicts IQ plane data points corresponding to a signal having a signal-to-noise ratio (SNR) of 28 dB and at phase angle of 0°.

FIG. 6A shows the IQ plane plot 100 when noise is added such that the SNR observed is approximately 28 dB. It is observed that two clearly defined small groups of data points: a group 102 of data points having data bit polarity (−1) and a group 104 of data points having data bit polarity (+1) are formed. FIG. 6A illustrates that when SNR is high it is relatively easy to distinguish one data bit polarity from another. The thick dashed line 106 of FIG. 6A represents the data bit decision threshold.

Figure 6B:
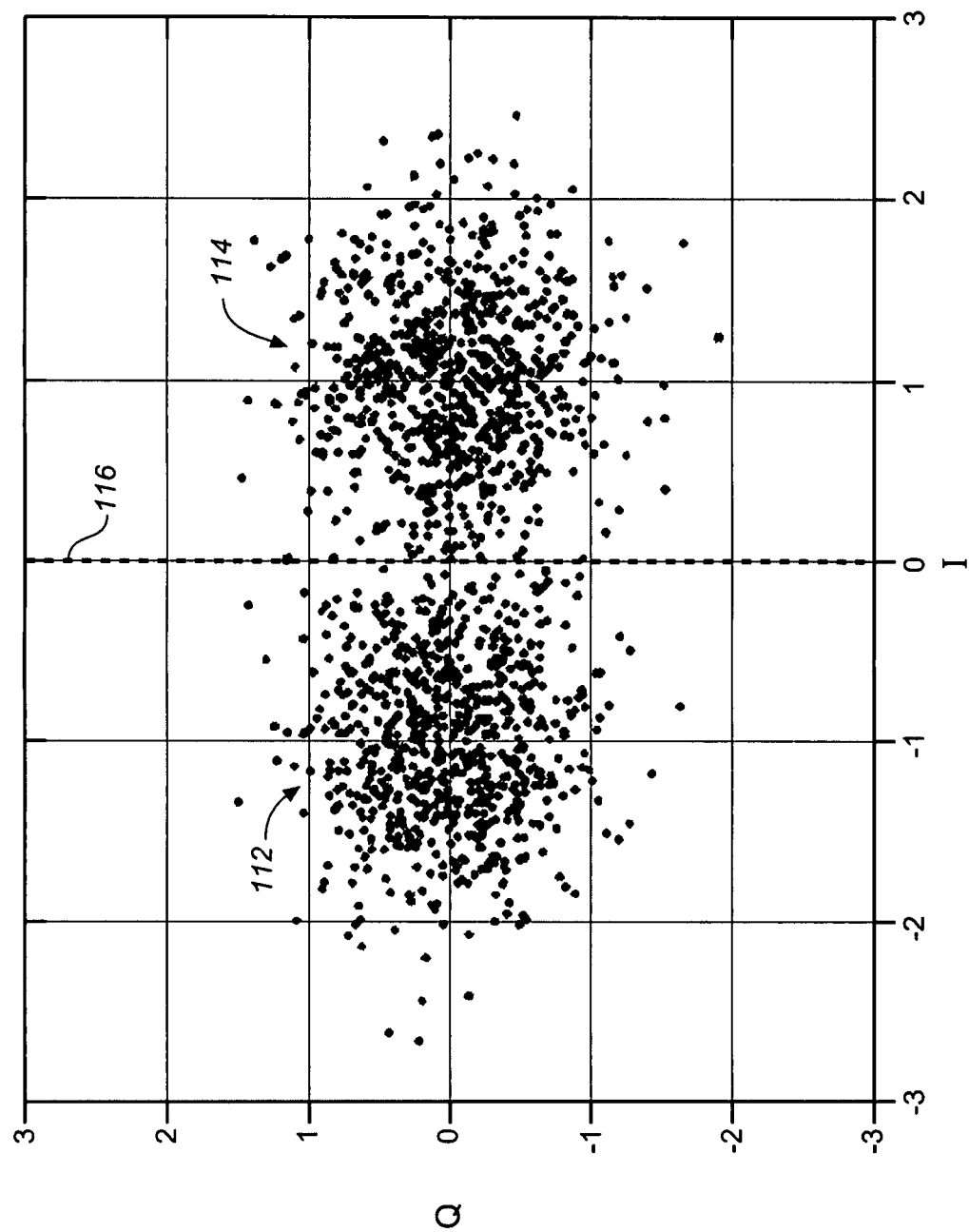
FIG. 6B shows IQ plane data points corresponding to a signal having SNR of 8 dB and at phase angle of 0°.

On the other hand, FIG. 6B shows the equivalent IQ plane plot 110 when the SNR is 8 dB. It is observed from FIG. 6B that it is more difficult to distinguish a group 112 of data bits approximately having data bit polarity (−1) and a group 114 of data points approximately having data bit polarity (+1) from each other. Indeed, the high noise, or low SNR, causes the data points go beyond the decision threshold line 116 so that the data bit errors occur. If data points go beyond the threshold line 116 far enough, the groups 112 and 114 of data points intersect, so that the data point (+1) can be interpreted as the data point (−1), and vice versa.

Figure 7:
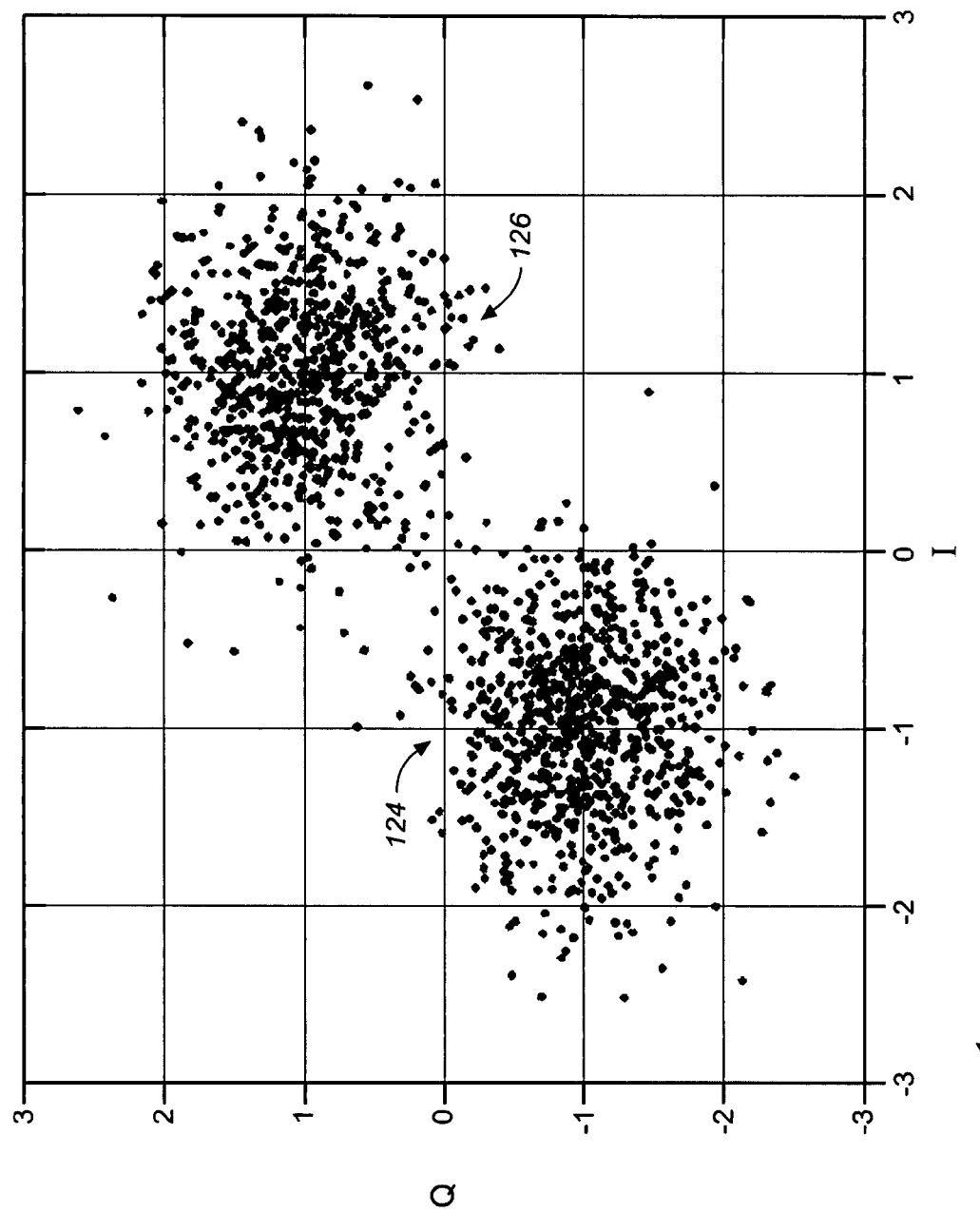
FIG. 7 depicts IQ plane data points corresponding to a signal having SNR of 8 dB and at phase angle of 45°.

FIG. 7 shows the combined effect of FLL and low SNR (8 dB) on the IQ plane plot 120. The FLL tracking means that the absolute carrier phase is not known and the GPS receiver attempts to detect the change in carrier phase to facilitate data decoding. The prior art algorithms that were typically used to decode data under these conditions are described below.

Indeed, the carrier phase transition between data bits can be computed using a number of different algorithms. Equations 3 and 4 (please, see below) represent two such algorithms. Each algorithm (according to Equation 3, or according to Equation 4) fundamentally performs the same task that is computing the probability of whether the data bit transition is closer to 0° or 180°.

In the first prior art algorithm of computing the probability of whether the data bit transition is closer to 0° or 180°, $C_{phase\ k}$ is the carrier phase at time k, and $C_{phase\ k}$ is computed by using function $\operatorname{atan}^{-1}(Q_{Pk}/I_{Pk})$:

$$P_{trans}=abs(C_{phase\ k}-C_{phase\ k-1}). \quad \text{(Eq. 3)}$$

Here, Abs ( ) takes the absolute value.

In the second prior art algorithm of computing the probability of whether the data bit transition is closer to 0° or 180°, the calculation of $\cos(C_{phase})$ is simplified while computing the scalar product:

$$P_{trans}=(I_{Pk}I_{Pk-1}+Q_{Pk}Q_{Pk-1})<0 \quad \text{(Eq. 4)}$$

Figure 8A:
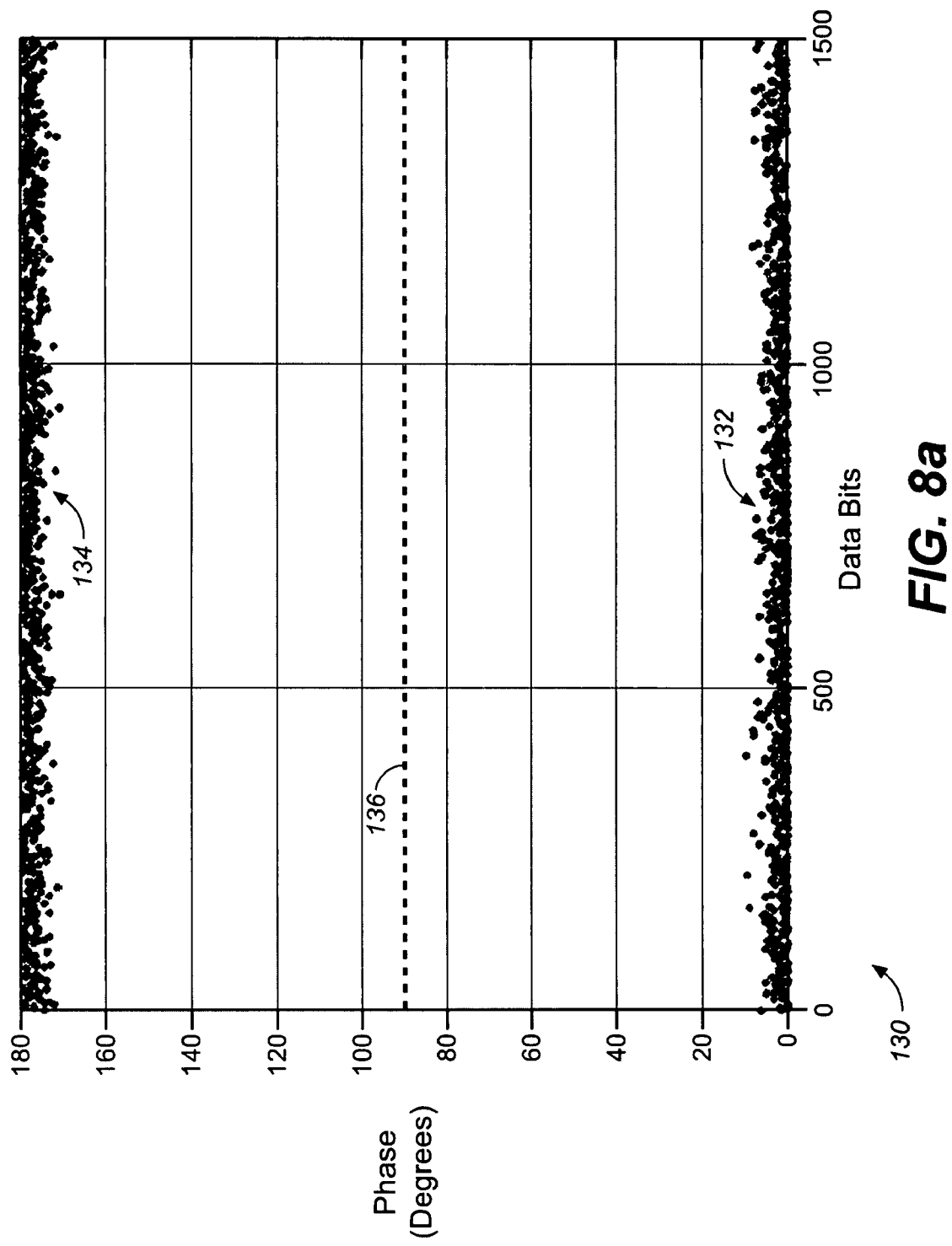
FIG. 8A illustrates a phase angle computation for a signal having SNR of 28 dB and at phase angle of 0°.
Figure 8B:
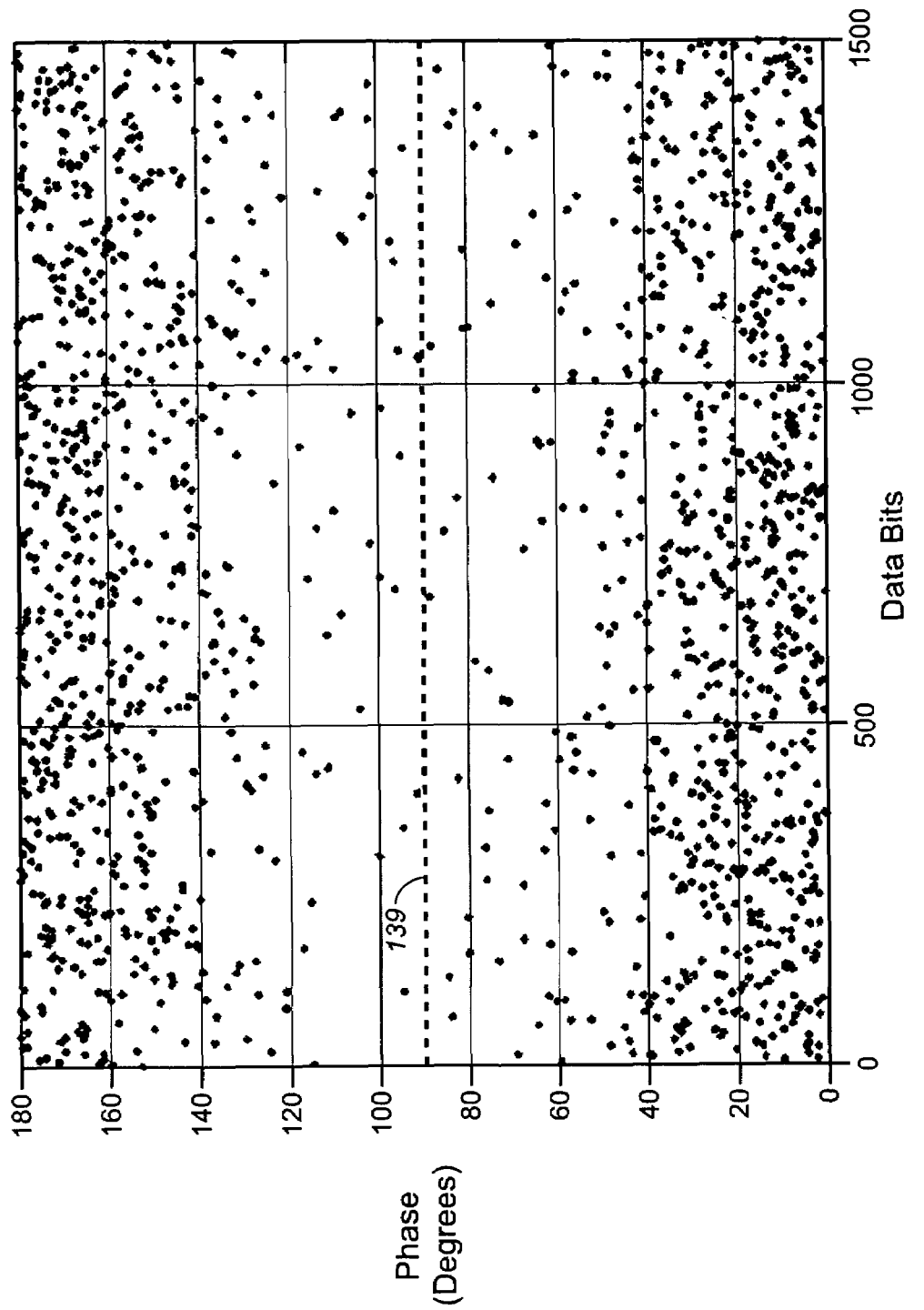
FIG. 8B shows a phase angle computation for signal having SNR of 8 dB and at phase angle of 0°.

FIGS. 8A and 8B show the result of measuring the carrier phase change between data bits for SNR of 28 dB (plot 130 of FIG. 8A) and for SNR of 8 dB (plot 140 of FIG. 8B) respectively. The thick dashed line (136 of FIG. 8A and 142 of FIG. 8B) again represents the data bit decision threshold. Once again it is observed that lower SNR causes more data points to approach (or cross, thus causing the data bit error) the decision threshold. FIGS. 8A and 8B are produced by using (Eq. 4).

As was stated above, the data decoding while using FLL tracking is dependent on whether the previous data bits were decoded correctly (memory effect). This memory effect manifests itself in a prior data bit error (or incorrectly decoded data bit) causing all subsequent data bits to be decoded incorrectly. FIG. 12A shows the effect of such errors (string of data bits 190) on a GPS data frame of 1500 data bits. The '0's and '1's represent correctly decoded data bits. The 'x's indicate wrongly decoded data bits (data bit errors). It is observed that data bit errors occur in long strings, this is the effect of a single data bit error causing all subsequent data bits to be wrong (or at least until another data bit error corrects the data decoding). The GPS 50 Baud data stream has an extended Hamming code for error detection and correction (please, see "Global Positioning System: Theory and Applications", Volume 1, pages 121-176, third printing, 1996, for details). The Hamming code can correct 1 data bit error for every 30 data bits sent (or roughly 3.3% of errors), and can detect 3 data bit errors for every 30 data bits sent. The data bit errors shown in FIG. 12A would overwhelm the data error correcting capacity of the Hamming code and render the data decode useless. Note that FIG. 12A shows the result of using one of the prior art data decoding algorithms at SNR 8 dB, but without having the benefit of implementing the decoding method (or decoding algorithm) of the present invention.

Figure 12B:
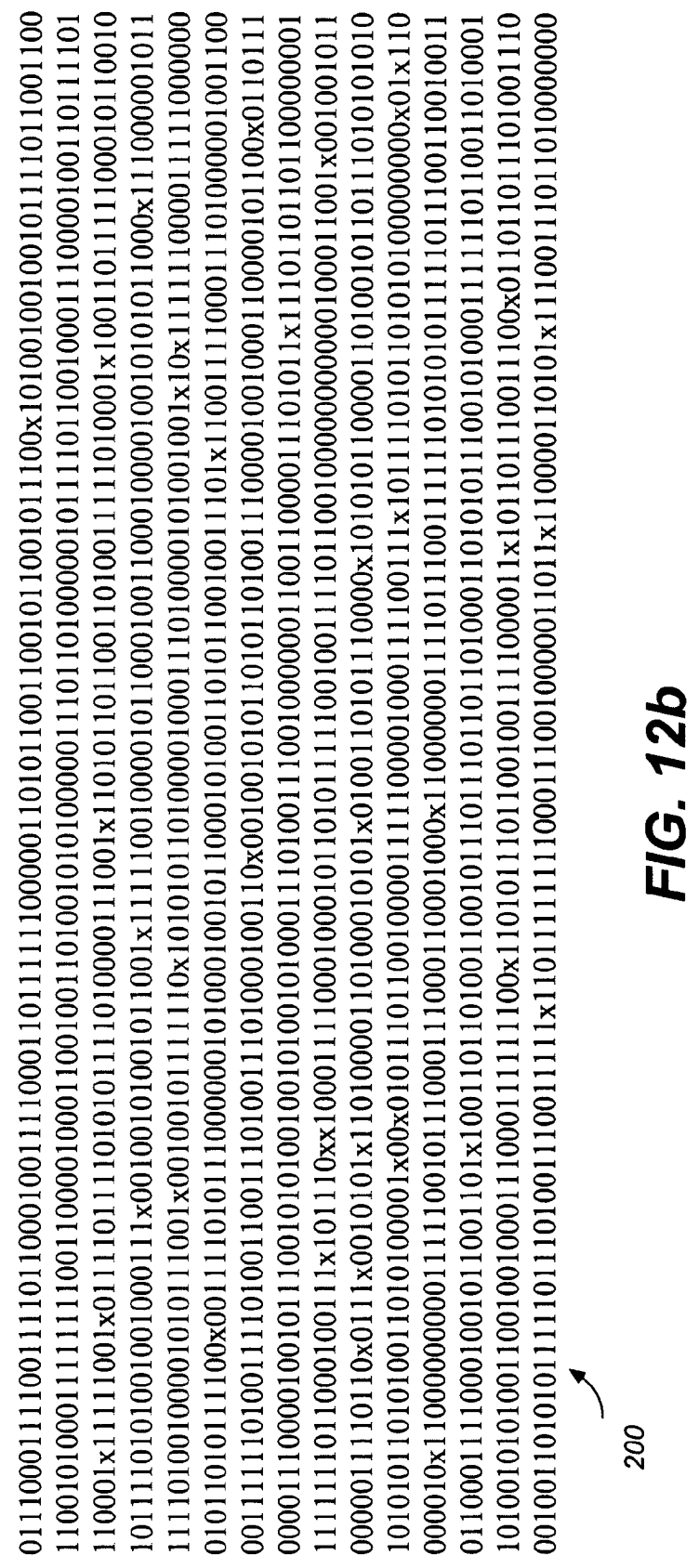

On the other hand, FIG. 12B illustrates (string of bits 200) the same decoding conditions as shown in FIG. 12A, but implementing the decoding method (or decoding algorithm) of the present invention. (Please, see full discussion below). From FIG. 12B it is observed that when the present invention is implemented, a single data bit error does not cause all subsequent bits to be in error, thus substantially reducing the number of data errors. Therefore, the subsequent usage of Hamming code's capabilities can further reduce (or correct) the data bit errors.

Figure 11A:
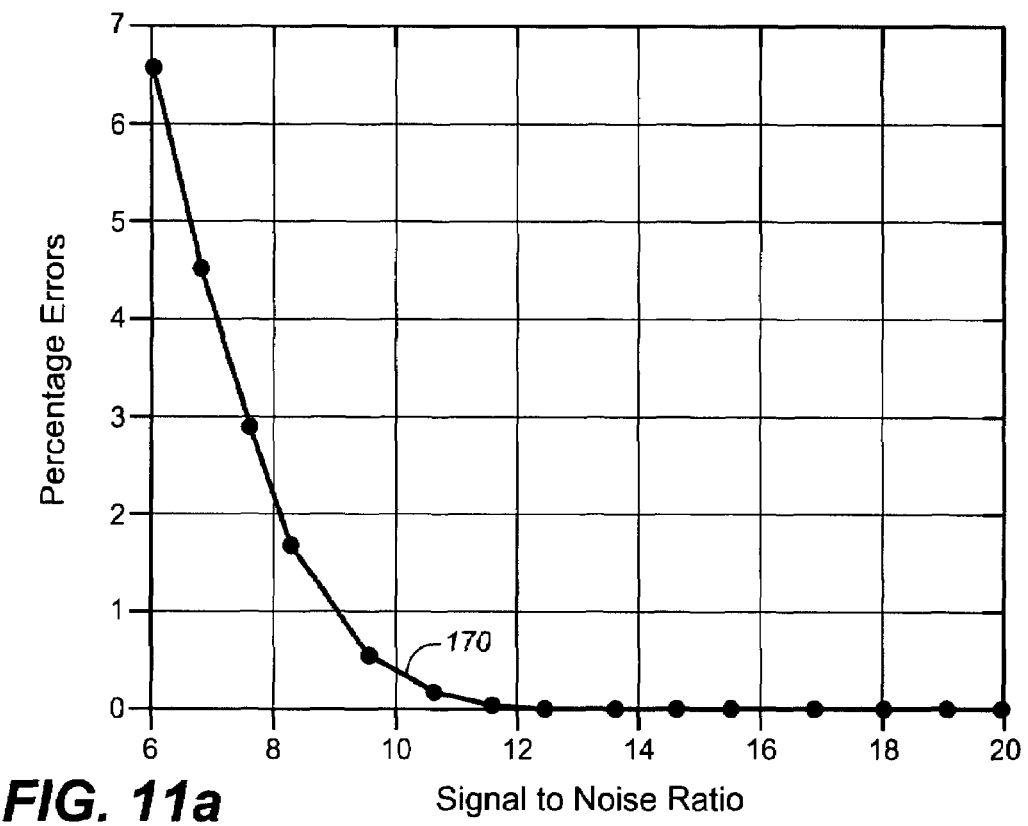
FIG. 11A shows a percentage of data bit errors for a signal having a given SNR by using a linear y-axis scale.
Figure 11B:
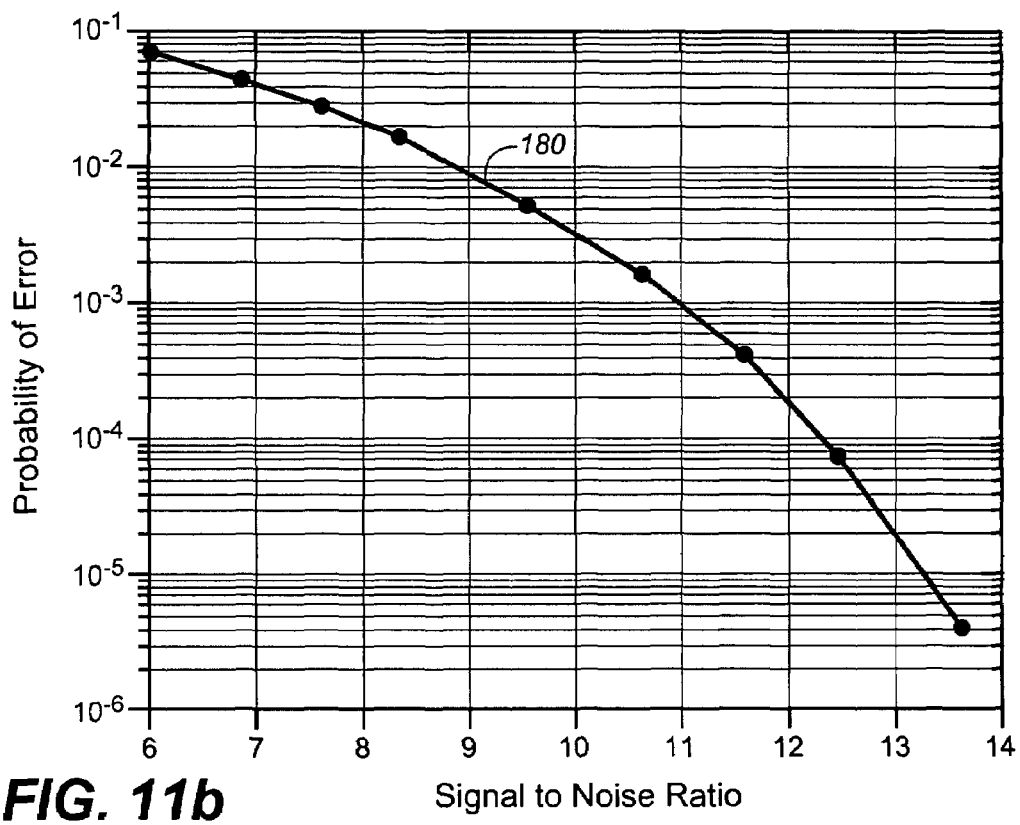
FIG. 11B depicts a probability of a data bit error rate (BER) for a signal having a given SNR using a logarithmic y-axis scale.

FIGS. 11A and 11B show the impact of SNR on data bit errors assuming that data bit errors do not cause all subsequent data bits to be in error. FIG. 11A illustrates (please, see curve 170) that with an SNR of 8 dB the expected percentage of data bit errors is around 2% if the decoding method of the present invention is implemented. This is lower than the 3.3% data bit correction capability of the Hamming code, indicating that most data bit errors could be corrected and most 30 bit GPS data words are correctly decoded.

FIG. 11B is a logarithmic plot 180 of the curve 170 of FIG. 11A. Plot 180 of FIG. 11B illustrates that even at higher SNRs (e.g. 11 dB), data bit errors still occur with enough frequency to cause data decode problems. For example, at SNR=11 dB, there is a significant probability ($10^{-3}$) of data error, that is at least one data bit error is to be expected in a GPS data frame of 1500 bits. However, as opposed to the prior art decoding algorithms, a single data bit error does not cause all subsequent data bits to be in error. If a prior art decoding algorithm is used, a data bit error probability would be much higher than $10^{-3}$, closer to 0.5, overwhelming the Hamming code's correction capabilities.

In the prior art the data bit phase transition was computed between current and last data bits, then multiplied by the data polarity of the last data bit, as shown in Equation 5.

$$r_k=sgn(P_{trans\ k-1}\times r_{k-1}). \quad \text{(Eq. 5)}$$

However, Eq. 5 does not reflect the fact that the result is also multiplied by the absolute data polarity determined from the Preamble sequence.

The algorithm used in the decoding method of the present invention computes the current data bit by computing the phase transition between the current bit and the last N data bits. In this way the calculation of the probability of the current bit being "1" or "0" is less dependent on the last data bit phase calculation, but is based, instead, on a majority decision average of the last N phase transitions. This reduces the contribution of the partial probability that the last data bit decision ($r_{k-1}$) is wrongly computed in the total probability of the current data bit being correctly computed. Therefore, the 'memory' effect is significantly reduced. In fact, the performance of the decoding algorithm of the present invention in the FLL tracking case approaches (but does not exceed) that of the PLL tracking case.

The decoding algorithm used in the decoding method of the present invention performs the calculation of probability according to Equation 6:

$$r_k=sgn(\Sigma_{1\ldots N}(P_{trans\ k-n}\times r_{k-n})); \quad \text{(Eq. 6)}$$

where, $r_k$ is the resulting data decode at time k, sgn is the sign of operation resulting in +/−1 output, $P_{trans\ k-n}$ is the phase transition calculation shown in Equations 3 and 4 at time k-n, $r_{k-1}$ is the data decode output at time k-N.

Figure 9:
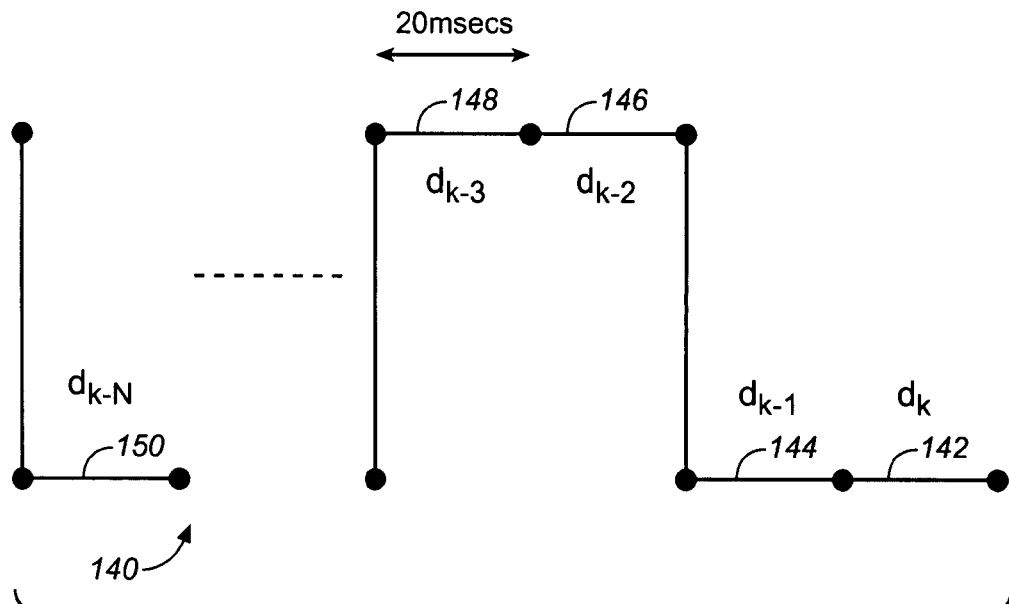
FIG. 9 illustrates a sequence of data bit computations.

The calculation of Equation 6 sums across N $P_{trans\ k-n}\times r_{k-n}$ calculations. FIG. 9 shows the current phase $d_k$ 142 and previous N data bit phases $d_{k-N}$ 150, ... $d_{k-3}$ 148, $d_{k-2}$ 146, and $d_{k-1}$ 144. To compute the new data bit $r_k$, one has to compute the phase change between data time $d_k$ and $d_{k-1}$ and multiply by the data decision already made at time k-1, $r_{k-1}$. This result is summed with the same operation performed between data time $d_k$ and $d_{k-2}$ and multiplied by the data decision already made at time k-2, $r_{k-2}$. This operation is continued between $d_k$ and $d_{k-n}$, resulting in a summation that is positive if a majority of the individual phase transitions suggest that the data bit is positive, and negative otherwise. Once again absolute data polarity is obtained by multiplying the $r_k$ value by the data polarity determined via the GPS data Preamble, not shown in Equation 6.

Figure 13:
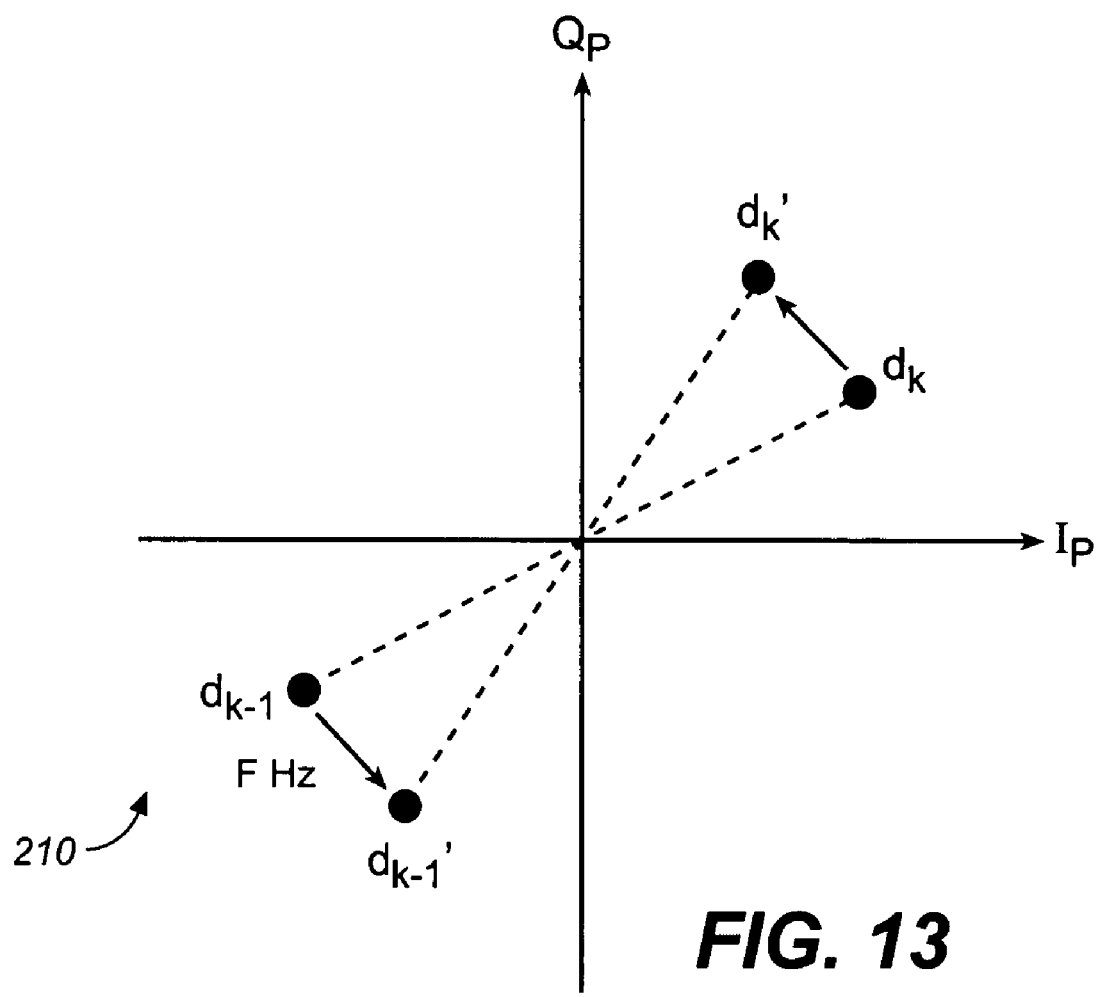
FIG. 13 illustrates a diagram showing the effect of frequency offset on data points in the IQ plane.

The larger N, the more of the previous data bit phases are used in the calculation, which further reduces the probability of a sequence of data bit errors. However, in practice it is not feasible to use a large N (e.g. N>20) because of the phase drift caused by small frequency errors, as illustrated in diagram 210 of FIG. 13. If the phase shifts significantly (e.g. >45°) across the N+1 data bits used by the decoding algorithm of the present invention, Equation 6 produces an incorrect result. Thus choice of an optimum N depends on frequency drift errors in the particular GPS receiver implementation. Some receivers have more accurate oscillators and less user motion where larger N could be utilized to further reduce the probability of data bit errors.

Figure 10:
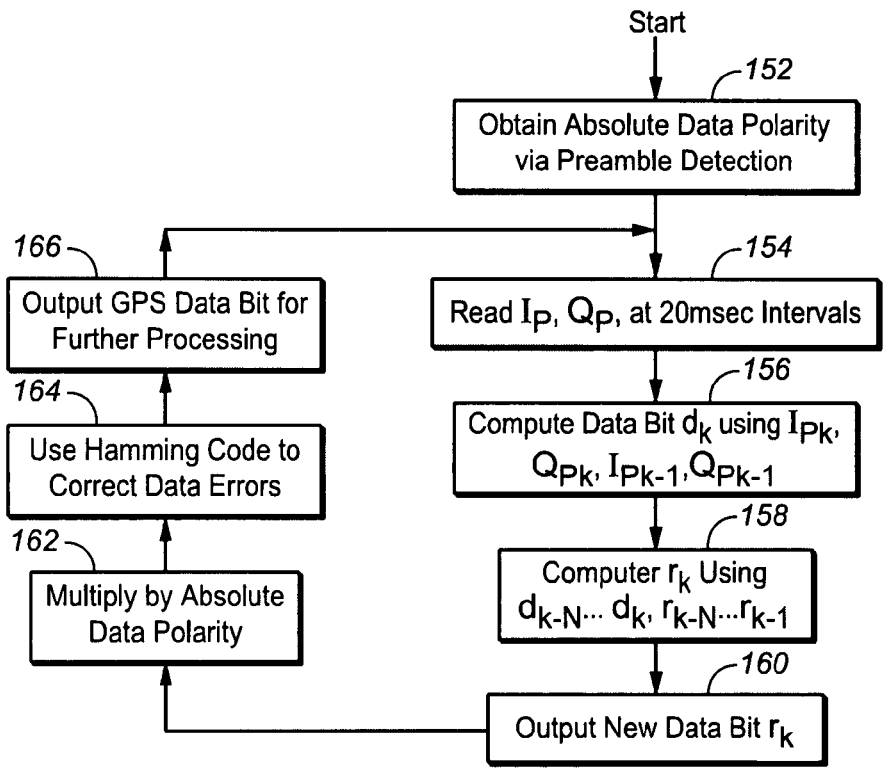
FIG. 10 is a flow chart of an implementation of the method of the present invention for decoding a GPS signal by using software running on a Microprocessor.

In one embodiment, FIG. 10 shows a flow diagram 150 of the software algorithm used to implement the present invention. The first operation (at step 152) is to determine absolute data bit polarity via Preamble sequence detection. Correlators $I_P$ and $Q_P$ are then read at 20 millisecond intervals (step 154). Then the phase transition is computed (at step 156) between the current and last data bits. The calculation of Equation 6 is then performed (at step 158) across the previous N data bits and the current data bit. The resulting data bit $r_k$ is then output (at step 160) and multiplied by the absolute data polarity (at step 162). At the next step a data correction code is used to correct any data bit errors. In one embodiment of the present invention, (step 164) the Hamming code is used to correct any data bit errors. If the Hamming code is used, it is performed across a 30 bit data word, so it is performed every 30 bits. At the next step (step 166) the data bits are output for use in other applications, including for internal receiver's use for navigation.

There are several applications in the field of GPS receiver systems that can benefit directly from the ability to get a better bit error rate in decoding the Satellite Data Message from the GPS satellites. These applications include survey receivers, geographic information systems (GIS) receivers, chipsets for use in cellphones, in-vehicle tracking and navigation systems, package tracking systems, and military applications using both coarse acquisition service and the precise service (P code or Y code.) All of these applications experience obscured signal paths from the satellites, resulting in reduced SNR.

The given above disclosure assumes the usage of GPS received of an average quality. However, if a very good GPS receiver oscillator is used and the GPS receiver is not moving, it is possible to predict the carrier frequency without using the FLL tracking. In this embodiment of the present invention, the method of decoding a GPS carrier signal without performing the initial step of tracking the GPS signal comprises the following steps: (A) receiving a phase modulated GPS signal by using a GPS antenna; (B) extracting a GPS data from the received phase modulated GPS signal; and (C) computing a total probability of a current GPS data bit being "one" or "zero" at a GPS time epoch by computing a plurality of probabilities of phase transitions at a plurality of GPS time epochs, wherein each probability of a phase transition at the GPS time epoch is a probability of a phase transition between a current phase of the received GPS phase modulated signal and a phase corresponding to a previously computed data bit. In one embodiment, the step (C) is performed by using the algorithm according to Equation 6.

The present invention described above is fully applicable to any satellite based signal, not necessarily to the GPS-emanated signals. For instance, the present invention is applicable to GLONASS-emanated signals, GALILEO-emanated signals, or combined GPS-GLONASS-GALILEO emanated signals.

The present invention is also fully applicable to decoding of signals generated by any ground based transmitter and having the properties similar to a GPS signal.

Another aspect of the present invention is directed to a method of decoding a received phase modulated carrier signal of an arbitrary nature, not necessarily a GPS based signal, satellite-based signal, or even ground-transmitter-based signal. In one embodiment of the present invention, the method of decoding a received phase modulated carrier signal comprises the following steps: (A) computing a total probability of a current data bit being "one" or "zero" at a time epoch by computing a plurality of probabilities of phase transitions at a plurality of time epochs, each probability of a phase transition at one time epoch being a probability of a phase transition between a current phase of the received phase modulated signal and a phase corresponding to a previously computed data bit; and (B) outputting the current data bit as being "one" or "zero" at the time epoch based on the computed in the step (A) total probability. In this embodiment, the assumption has been made that the signal (of arbitrary nature) that has to be decoded has been already successfully received. In one embodiment of the present invention, the step (A) is performed by using the Equation 6 (as was discussed fully above). Thus, though the present invention has been described above in terms of GPS data decoding, it is equally applicable to the decoding of any phase modulated signals in other systems. In its broadest terms, the invention involves using multiple previous data bits transition information to reduce the probability of causing an extended sequence of data bit errors, as was present in the prior art techniques. The invention reduces the SNR required for successful data decoding.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of decoding a GPS carrier signal without performing the initial step of tracking, said method comprising:

(A) receiving a phase modulated GPS signal by using a GPS antenna;

(B) extracting a GPS data from said received phase modulated GPS signal;

(C1) obtaining an absolute data polarity via preamble sequence detection;

(C2) reading correlator $I_P$ (inphase punctual) and correlator $Q_P$ (quadrature punctual) at each epoch times; wherein a new GPS data bit is transmitted at each said epoch time;

(C3) computing the partial probability of the decoded data bit $r_k$ at time epoch k by computing the phase change between data bit phase $d_k$ at time epoch k and data bit phase $d_{k-1}$ at time epoch (k-1);

(C4) computing a total probability of the decoded data bit $r_k$ at time epoch k by summing the partial probability obtained in step (C3) over the N preceding time epochs (k-1), (k-2), . . . (k-N); and (C5) multiplying a new data bit $r_k$ at time epoch k obtained in said step (C4) by said absolute data polarity obtained in said step (C1) to obtain a data bit having said total probability obtained in said step (C4) of being an actual received GPS data bit at said time epoch k.

2. The method of claim 1, wherein said step (C3) further comprises:

(C3, 1) computing the partial probability of the decoded data bit $r_k$ at time epoch k by computing the scalar product of vector $(I_{Pk}, Q_{Pk})$ at time epoch 'k' and vector $(I_{Pk-1}, Q_{Pk-1})$ at time epoch 'k-1'.

* * * * *